United States Patent [19]
Morokuma

[11] Patent Number: 5,142,146
[45] Date of Patent: Aug. 25, 1992

[54] HIGH-ACCURACY POSITION COMPARATOR USING 2 DIMENSIONAL GRATING

[75] Inventor: Tadashi Morokuma, Tokyo, Japan

[73] Assignee: Olympus Optical Co., Ltd., Tokyo, Japan

[21] Appl. No.: 714,722

[22] Filed: Jun. 13, 1991

[30] Foreign Application Priority Data

Jun. 13, 1990 [JP] Japan ................................. 2-154659

[51] Int. Cl.⁵ ................................................ H01J 3/14
[52] U.S. Cl. .................................. 250/237 G; 356/356
[58] Field of Search ........................... 250/237 G, 561; 356/356, 374

[56] References Cited

U.S. PATENT DOCUMENTS

| | | | |
|---|---|---|---|
| 3,891,321 | 6/1975 | Hock | 250/237 G |
| 4,656,347 | 4/1987 | Une et al. | 356/356 |
| 4,991,962 | 2/1991 | Jain | 356/356 |
| 4,998,823 | 3/1991 | Kitajima | 356/356 |

Primary Examiner—David C. Nelms
Assistant Examiner—S. Allen
Attorney, Agent, or Firm—Cushman, Darby & Cushman

[57] ABSTRACT

A high-accuracy position comparator includes a length-measuring grating having a ruling extending two-dimensionally, a reflecting device, an index grating having the ruling following the same direction as that of the length-measuring grating, a grating overlapping optical system comprised of a projecting device for projecting an image of one of these two gratings and an imaging device for forming the image through the reflecting device, a fringe detecting device for detecting interference fringes produced by the optical system, and a measuring position detecting device. Thus, the comparator has practically important advantages of being able to make two-dimensional measurement and positional comparison without resetting an object being measured.

8 Claims, 10 Drawing Sheets

HIGH-ACCURACY POSITION COMPARATOR USING 2 DIMENSIONAL GRATING

BACKGROUND OF THE INVENTION a) Field of the invention

This invention relates to a high-accuracy position comparator for performing the measurement of a dimensional profile of an object and the positional comparison between two objects, with a high degree of accuracy, by using moire fringe gratings, laser scales, graduated rulers or the like.

b) Description of the prior art

In the past, instruments have been known in which the dimension of an object is measured with a considerable degree of accuracy by using moire fringe gratings, laser scales, graduated rulers or the like as standard scales and the positions of two objects are made to coincide accurately with each other.

Each of these instruments, for example, as shown in FIG. 1, comprises a base 1, a standard scale 2 fixed to the base 1, a stationary bed 3 protruding from the surface of the base 1, and a movable bed 4 slidable along the surface of the base 1 so that whenever the length of an object being measured 5 is determined, the object 5 is interposed between the stationary bed 3 and the movable bed 4 to read out the position of the movable bed 4 on the standard scale 2. If, however, an axis of measurement is inclined as depicted in FIG. 2, an error will be produced as to the reading-out of the standard scale 2. To prevent such a difficulty, the so-called Abbe's principle is applied so that as shown in FIG. 3, the axis of measurement of the object being measured 5 is positioned in alignment with the standard scale 2 and thereby the error due to the inclination is minimized. In such an instance, however, the problem has arisen that the instrument needs the overall length at least twice that of the object 5 with resultant oversizing of the instrument.

In contrast thereto, an apparatus has been proposed in which even when the axis of measurement of the object is positioned out of alignment with the standard scale, the error in Abbe's principle is not produced. This apparatus applies the so-called Eppenstein's principle and, for example, as shown in FIG. 4, includes a prism 6 and a lens 7 which are fixed to the base 1 not to move with respect to the stationary bed 3, and a lens 8 and a prism 9 which are disposed integral with the movable bed 4 so that an image 10' of an indicator 10 provided in the stationary bed 3 is projected onto the standard scale 2 through the prism 6, the lenses 7 and 8, and the prism 9, thereby causing the position of the movable bed 4 to be read out. If a distance f between the axis of measurement and the standard scale 2 is to be equal to the focal length of the lens 8 and as illustrated in FIG. 5 by way of example, the movable bed 4 is inclined at an angle φ, an error equal nearly to fφ will be produced. Since, however, the lens 8 and the prism 9 are moved and inclined along with the movable bed 4 and a principal ray emanating from the indicator 10 is also inclined at the angle φ, it follows that the ray is projected onto the standard scale at a position shifted by fφ in the direction that the error is offset and as a result, the image 10' of the indicator 10 is always projected at a proper position of the standard scale 2 without any error.

Any of the conventional examples stated above, however, has had the problems that the measurement can be made only in a one-dimensional direction, while in the case of the measurement of a two-dimensional object in a two-dimensional direction, it is required that the object is reset for twice-measurement with great trouble.

SUMMARY OF THE INVENTION

It is, therefore, an object of the present invention to provide a high-accuracy position comparator in which the measurement and the positional comparison can be made two-dimensionally without resetting an object being measured.

This object is accomplished, according to the present invention, by providing a length-measuring grating two-dimensionally extending, fixed to a base to measure the dimension of the object being measured; a reflecting means fixed to the base; and index grating identical in direction of a ruling with the length-measuring grating; a grating overlapping optical system including a projecting means for once projecting, at infinity, an image of one of the two gratings toward the reflecting means and an imaging means for forming the projected image at infinity reflected by the reflecting means on the other of the two gratings; an interference fringe detecting means for detecting interference fringes produced by the grating overlapping optical system; and a measuring position detecting means for detecting the position of a measuring point on an object being measured. This arrangement is made so that the grating overlapping optical system, the interference fringe detecting means, and the measuring position detecting means are together fixed to a movable body, thereby enabling the measurement and the positional comparison to be performed two-dimensionally without resetting the object being measured.

According to the present invention, in addition to the foregoing arrangement, the distance from a measuring position at the object being measured to a position where the gratings are overlapped is made equal to the focal length of the projecting means so that no error is produced by the same principle as in Eppenstein's one.

Further, according to the present invention, in addition to the above arrangement, the reflecting means may be arranged perpendicular to the length-measuring grating and the length-measuring grating may also be used as the reflecting means.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1:
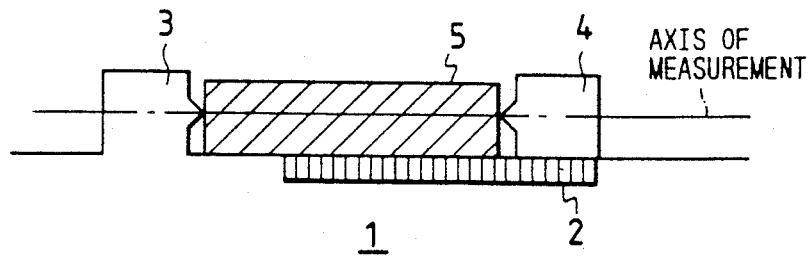
FIG. 1 is a schematic longitudinal sectional view of one conventional example.
Figure 2:
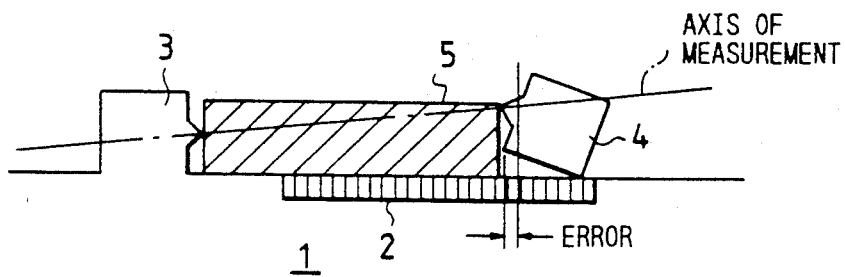
FIGS. 2 and 3 are views showing the principle by which an error is produced and the application of Abbe's principle, respectively, in the conventional example.
Figure 3:
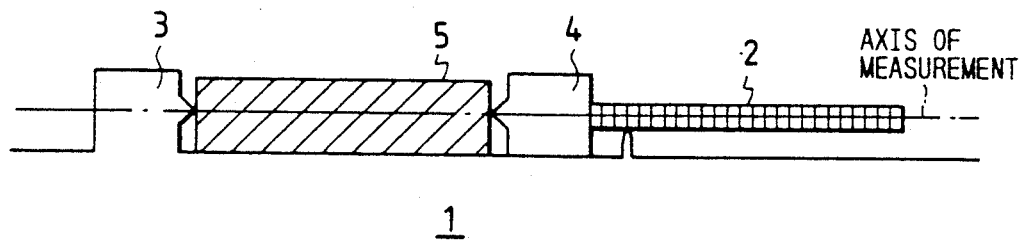
Figure 4:
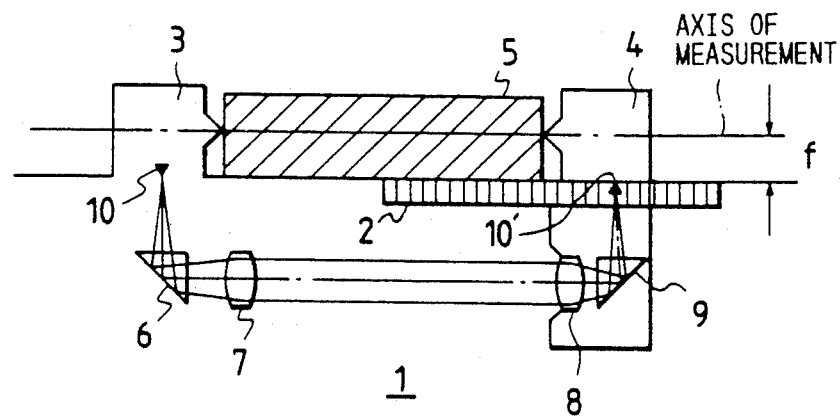
FIG. 4 is a schematic longitudinal sectional view of the other conventional example.
Figure 5:
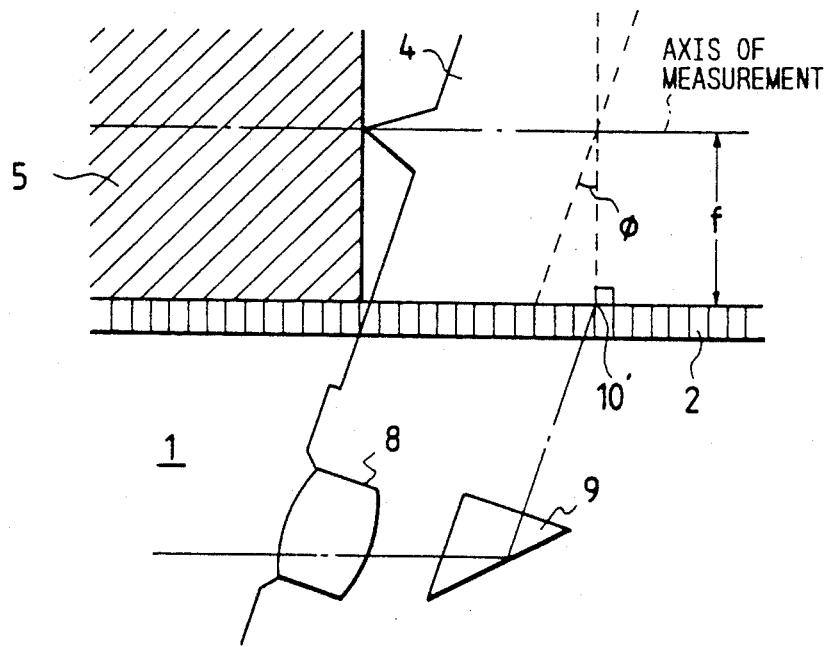
FIG. 5 is a view showing the application of Eppenstein's principle in the other conventional example.

In accordance with the embodiments shown in the drawings, the present invention will be explained in detail below.

Figure 6:
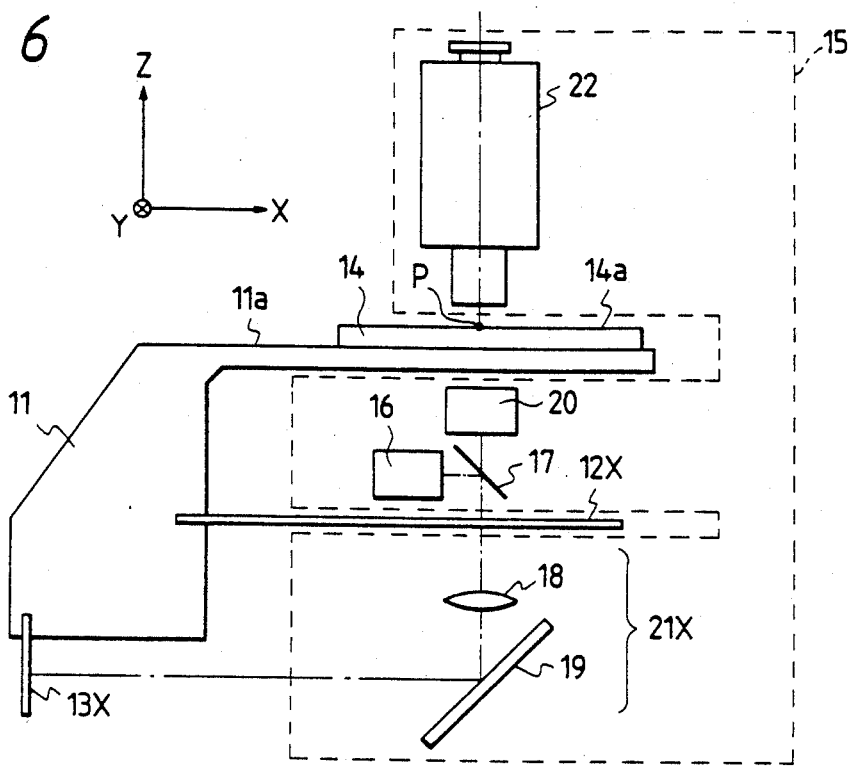
FIG. 6 is a longitudinal sectional view of a first embodiment of the high-accuracy position comparator according to the present invention.
Figure 7:
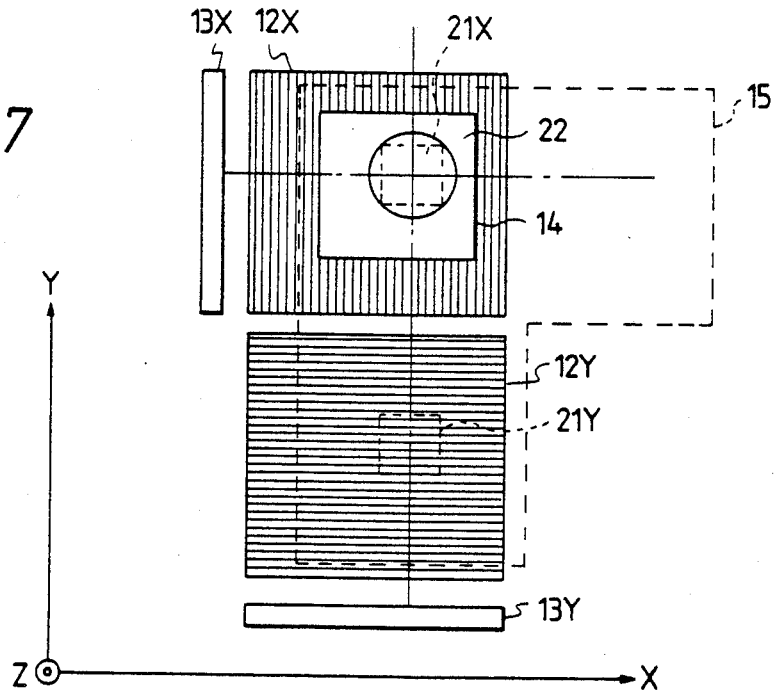
FIG. 7 is an essential plan view of the first embodiment.

FIG. 6 is a longitudinal sectional view, that is, a view showing a section perpendicular to the direction of the Y axis, of the first embodiment of the high-accuracy position comparator according to the present invention, and FIG. 7 is an essential plan view thereof.

In the figures, reference numeral 11 represents a base having a sample mounting section 11a, 12X and 12Y moire fringe gratings fixed to the base 11, fundamentally parallel to the object mounting section 11a, and 13X and 13Y plane mirrors extending the directions of the Y and X axes, fixed to the base 11 so as to be normal to the moire fringe gratings 12X and 12Y, respectively, so that an object being measured 14 is thus placed on the object mounting section 11a.

Reference numeral 15 denotes a movable body which can be shifted in the directions of the X and Y axes with respect to the object mounting section 11a and the moire fringe gratings 12X and 12Y. Numeral 16 denotes an illuminating light source and 17 a semi-transmissive mirror, which constitute an illumination system for illuminating the moire fringe grating 12X. Numeral 18 designates a lens arranged to coincide in its focal position with the moire fringe grating 12X, projecting an image of the moire fringe grating 12X at infinity, 19 a plane mirror directing light emerging from the lens 18 toward the plane mirror 13X and returning reflected light from the plane mirror 13X to the lens 18, and 20 a detector detecting an interference condition caused by overlapping a grating image formed on the moire fringe grating 12X by the lens 18 with the grating, in which the lens 18 and the plane mirror 19 constitute a grating overlapping optical system 21X also sued as the projecting means and the imaging means. Similarly, a grating overlapping optical system 21Y, the illumination system, and the detector 20 are also disposed for the moire fringe grating 12Y (refer to FIG. 7). Numeral 22 represents a microscope (namely, a measuring position detecting means) for detecting any point on the object being measured 14. The foregoing components, as seen from FIG. 7, are fixed to the movable body 15.

The function of the first embodiment is next explained.

Now, it is assumed that the distance in the direction of the X axis from the end on the left side of the object being measured 14 to a point P is measured.

Since the moire fringe grating 12X is illuminated by the illuminating light source 16, it follows that the image of the grating 12X is projected on the grating 12X per se in the course of the lens 18, the plane mirror 19, the plane mirror 13X, the plane mirror 19, and the lens 18. In this case, if the above optical elements are arranged so that the image of the grating 12X is slightly inclined from the position of the original grating 12X within the plane of the grating 12X, the grating 12X will interfere with the image to generate moire fringes, which are detected by the detector 20.

Here, if the movable body 15 is moved in the direction of the X axis, the grating 12X and the image will relatively be shifted. As a result, the moire fringes are also moved, so that when the number of moire fringes is detected by the detector 20 for counting, the length of travel and the position of the movable body 15 are known from the counted value.

Hence, the left end of the object 14 is first viewed through the microscope 22, for instance, to make one of graduations provided in the visual field of the microscope coincide with the left end. Starting from this condition, the number of moire fringes is counted and when the point P arrives at the position of the same graduation in the visual field, the counting is stopped.

By the counted number of moire fringes, the distance is thus found which ranges from the left end to the point P of the object 14. Since, in fact, the distance does not necessarily come to the value corresponding accurately to an integral multiple of the moire fringes, an intermediate length between the moire fringes is to be read by using the technique known as the interference fringe counting method. The length of the object being measured can thus be determined with a high degree of accuracy.

The measurement of the distance in the direction of the Y axis is also made in the same manner as in the foregoing explanation.

Since, in the example mentioned above, the axis of measurement (which coincides with a surface 14a of the object being measured 14) is considerably distant from the moire fringe grating 12X, the inclination of the movable body 15 give rise to the error. This, however, is removed by making the distance from the measuring position at the object being measured to the position where the grating is overlapped equal to the focal length of the lens 18, which will be described in detail below.

Figure 8:
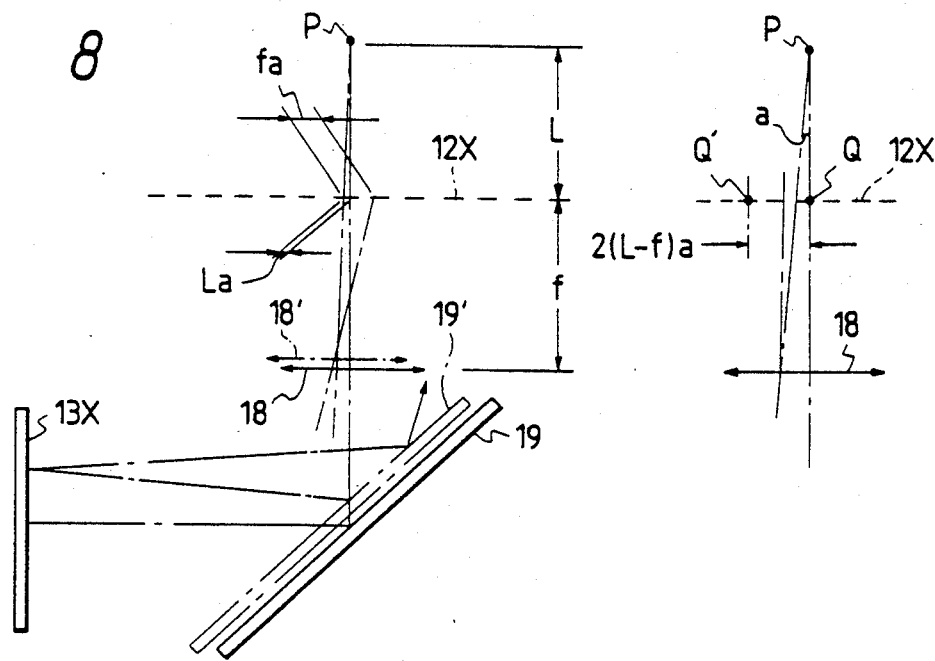
FIG. 8 is a view showing an error eliminating principle in the first embodiment.

Now, it is assumed that the movable body 15 is rotated, with a center at the point P, through an angle a around the Y axis. In this case, the microscope 22 and the point P are relatively held in the same positional relationship, but as shown in FIG. 8, when the plane mirror 19 is shifted to the position of numeral 19', it is returned to the lens 18, a beam of light is inclined by 4a in a clockwise direction. Here, where the foot of a perpendicular drawn from the point P to the moire fringe grating 12X is represented by Q, the distance from the point Q to the moire fringe grating 12X by L, and the focal length of the lens 18 by f, the lens 18 is inclined by the angle a and laterally moved by (L+f)a to arrive at the position of numeral 18', so that the inclination of the principal ray passing through the point Q is expressed by (1+L/f)a and when reflected from the plane mirror 13X and returned, it comes to −(1+L/f)a. That is, the beam of light is inclined clockwise by 2(1+L/f)a as a whole. Hence, when 4a=2(1+L/f)a, when L=f, the light beam emanating from the point Q is returned thereto, namely, the image of the grating is formed on the moire fringe grating 12X in the same relation as in the state before the rotation of the movable body 15, with the result that the number of moire fringes to be detected remains unchanged. By thus spacing the surface being measured 14a at the distance equal to the focal length of the lens 18 from the moire fringe grating 12X, the error relating to Abbe's principle an be removed. Also, when the movable body 15 is rotated about the X axis, the movement of the image of the grating is effective for only the inclination of more than square of the angle a, so that the error is little produced.

The error of the measurement in the direction of the Y axis is also eliminating by the same principle as in the above description.

Thus, according to the first embodiment, the object being measured 14 is not reset for two-dimensional measurement and positional comparison.

Figure 9:
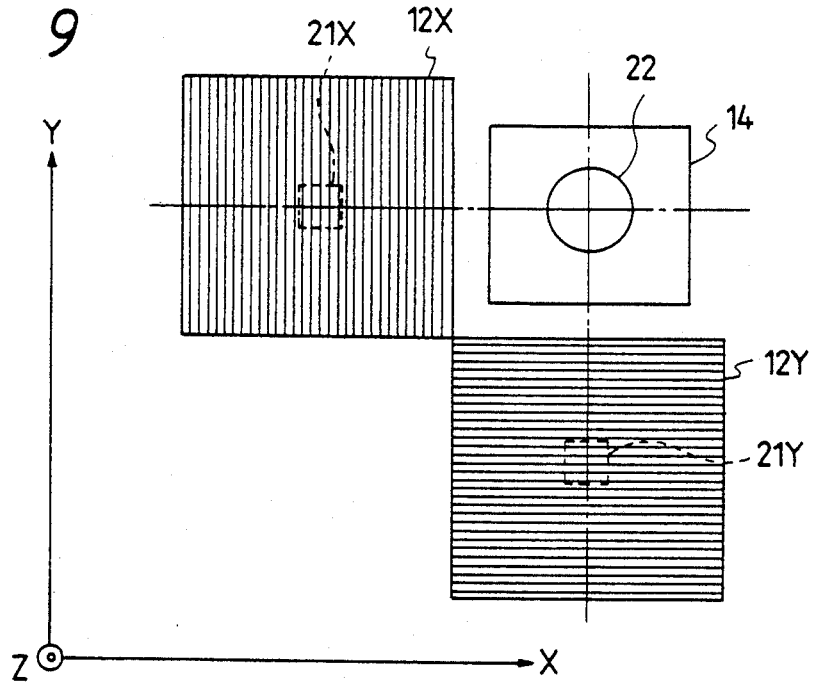
FIG. 9 is an essential plan view of a second embodiment.

FIG. 9 is an essential plan view of the second embodiment. In this embodiment, the two moire fringe gratings 12X and 12Y are arranged to fulfill Abbe's condition so that the gratings 12X and 12Y and the object being measured 14 are fixed integral with one another and the grating overlapping optical systems 21X and 21Y and the microscope 22 are constructed integral with one another to be movable in the directions of the X and Y axes.

Figure 10:
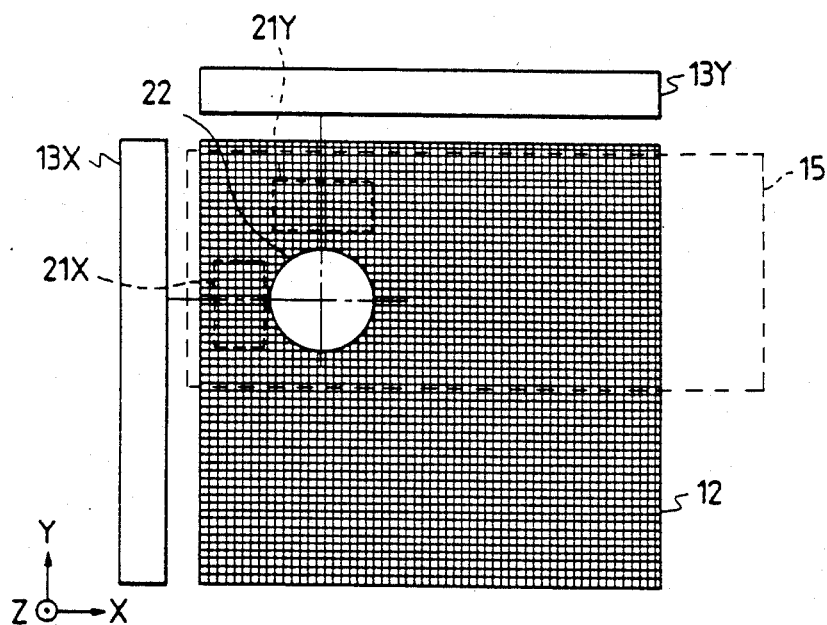
FIG. 10 is an essential plan view of a third embodiment.

FIG. 10 is an essential plan view of the third embodiment, in which a moire fringe grating 12 composed of a two-dimensional ruling is employed and constructed so that the optical axis of the microscope 22 traverses the intersection of the axes of the grating overlapping optical systems 21X and 21Y in the directions of the X and Y axes. Although, in such an instance, a space is required about twice the measuring range, there is the advantage that the space dimension compared with the first embodiment.

Figure 11:
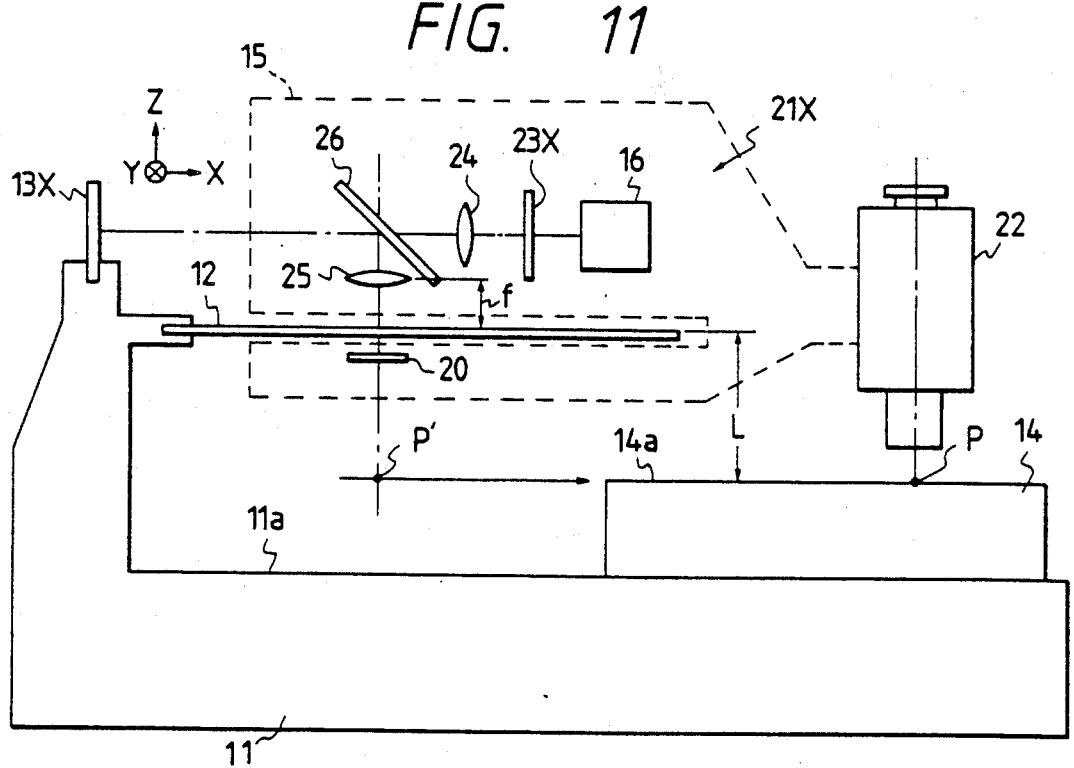
FIG. 11 is a longitudinal sectional view of a fourth embodiment.

FIG. 11 is a longitudinal sectional view of the fourth embodiment, in which the index grating 23X is used, independently of the moire fringe grating 12, and the projecting and imaging means of the grating overlapping optical system are separately arranged so that the index grating 23X is disposed at the focus position of a lens for projection 24 and the moire fringe grating 12 coincides with the focus position of a lens for imaging 25. Reference numeral 26 denotes a semi-transmissive mirror.

Figure 12:
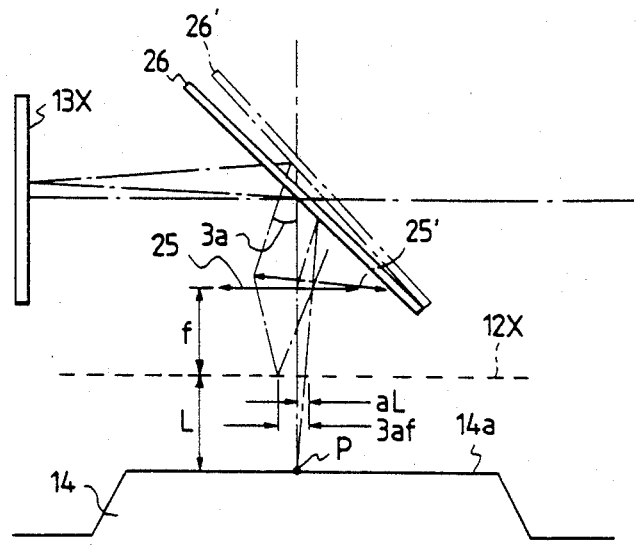
FIG. 12 is a view showing an error eliminating principle in the fourth embodiment.

Light emitted from the illuminating light source 16 illuminating the index grating 23X and light from the index grating 23X comes to infinitely projected light through the lens 24, after passing through the semi-transmissive mirror 26, is reflected from the plane mirror 13X, and further reflected from the semi-transmissive mirror 26 to be formed as an image of the index grating 23X, on the moire fringe grating 12, by the lens 25 so that the moire fringes are detected by the detector 20. In this case, even though the movable body 15 is somewhat inclined, Abbe's error will be eliminated when L=3f, as depicted in FIG. 12. That is, the fourth embodiment has the advantage that since the distance between the grating 12 and the surface being measured 14a is thrice that of the first embodiment, the arrangement of the apparatus is facilitated.

Figure 13:
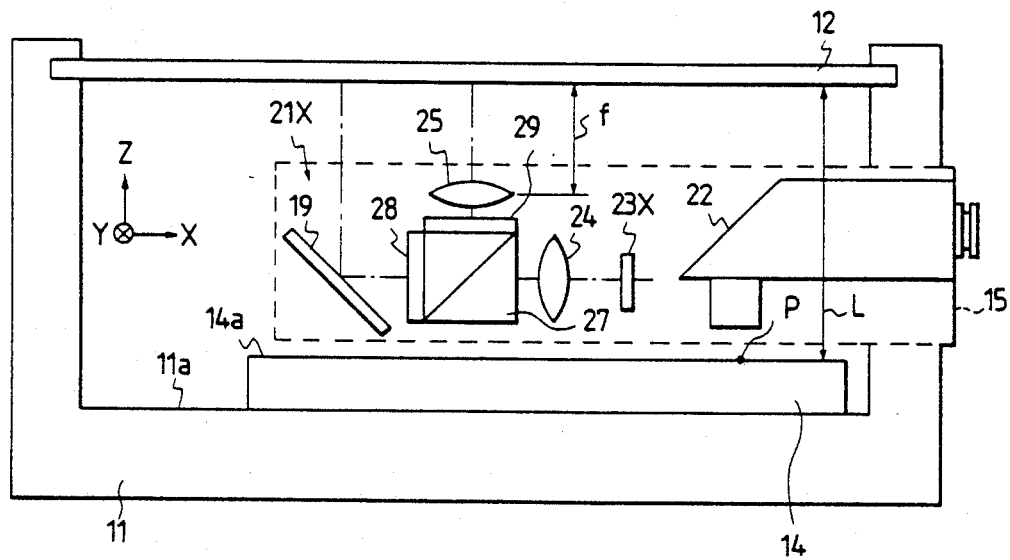
FIG. 13 is a longitudinal sectional view of a fifth embodiment.
Figure 14:
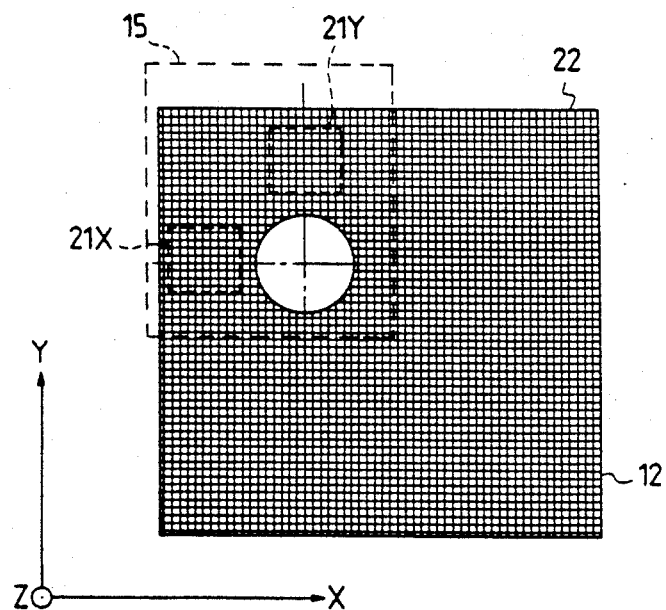
FIG. 14 is an essential plan view of the fifth embodiment.

FIG. 13 is a longitudinal sectional view of the fifth embodiment and FIG. 14 an essential plan view thereof. In this embodiment, the moire fringe grating 12 is also made to function as the plane mirrors 13X and 13Y, and linearly polarized light is used as illuminating light. Reference numeral 27 represents a polarization beam splitter and 28 and 29 quarter-wave plate. Also, the arrangement is such that, like the third embodiment, the optical axis of the microscope 22 traverses the intersection of the optical axes of the grating overlapping optical systems 21X and 21Y.

The linearly polarized light in which the direction of vibration is parallel with the plane of the figure, emitted from the illuminating light source not shown illuminates the index grating 23X, and light from the index grating 23X comes to infinitely projected light through the lens 24, is transmitted by the polarization beam splitter 27, changes to circularly polarized light at the quarter-wave plate 28, and after being reflected from the plane mirror 19, enters the moire fringe grating 12. The light reflected by the moire fringe grating 12 in succession, is reflected at the plane mirror 19, changes to the linearly polarized light in which the direction of vibration is normal to the plane of the figure, at the quarter-wave plate 28, and is reflected from the polarization beam splitter 27. The light then turns to the circularly polarized light at the quarter-wave plate 29 and is formed as the image of the index grating 23X on the moire fringe grating 12 through the lens 25. Additionally, the light of the image of the grating overlapped on the moire fringe grating 12 changes again to the linearly polarized light with the direction of vibration parallel to the plane of the figure at the quarter-wave plate 29 and is transmitted through the polarization beam splitter 27 so that the moire fringes are detected by the detector not shown. In such an instance, when the distance L between the object surface being measured 14a and the moire fringe grating 12 is twice the focal length f of the lens 25, Abbe's error is removed.

The fifth embodiment has an advantage that the microscope 22 and the grating overlapping optical systems 21X and 21Y are compactly constructed. Further, there is another advantage that the movable body 15 is hard to interfere with the moire fringe grating 12 and the object being measured 14. Moreover, a further advantage is secured that, unlike the third embodiment (FIG. 10), it is not required that the plane mirrors 13X and 13Y are arranged around the moire fringe grating 12 and hence the entire comparator can be constructed in substantially the same size as that of the moire fringe grating 12.

Figure 15:
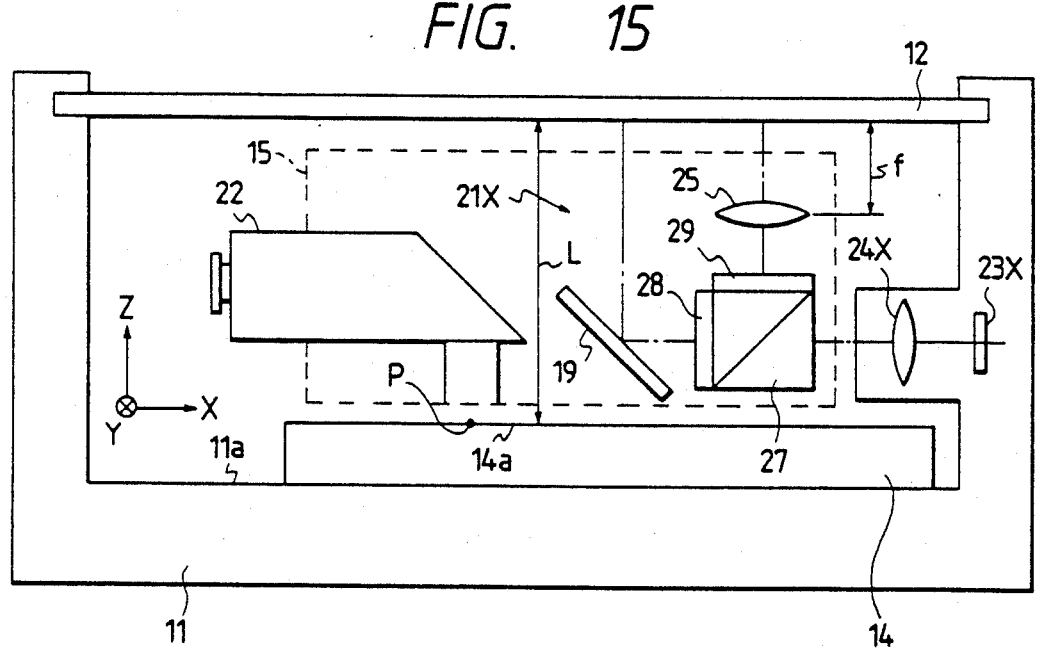
FIG. 15 is a longitudinal sectional view of a sixth embodiment.
Figure 16:
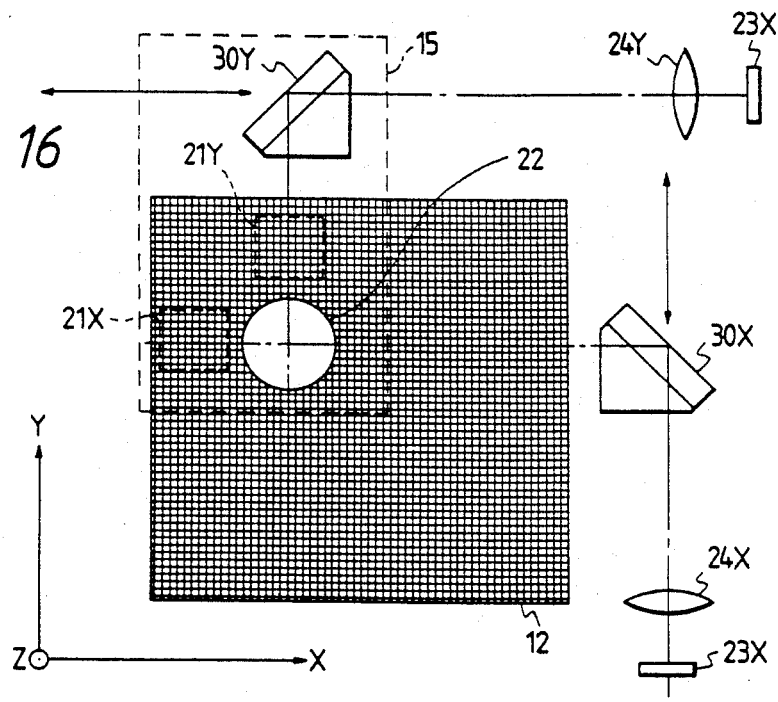
FIG. 16 is an essential plan view of the sixth embodiment.

FIG. 15 is a longitudinal sectional view of the sixth embodiment and FIG. 16 an essential plan view thereof. This embodiment, in comparison with the fifth embodiment, is adapted to fix the index gratings 23X and 23Y and the lenses 24X and 24Y to the base 11 and to use Dach prisms 30X and 30Y moving in only the directions of the Y and X axes, respectively, so that the linearly polarized light is incident on the beam splitter 27 in all cases.

Figure 17:
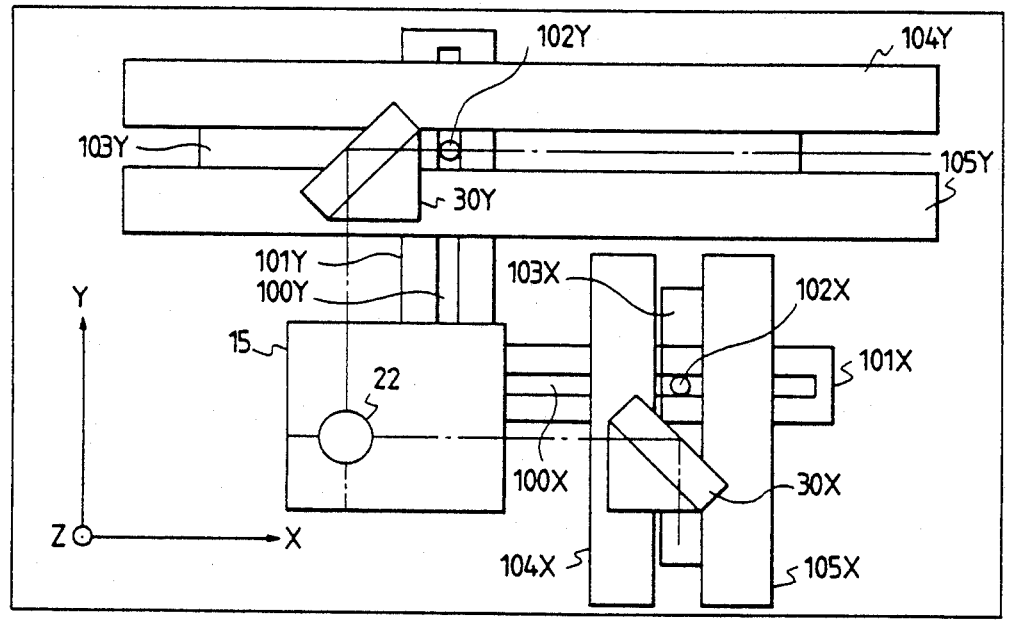
FIG. 17 is a plan view of a Dach prism guiding mechanism of the sixth embodiment.

As illustrated in FIG. 17, the Dach prism 30X, when the movable body 15 is shifted, is constructed to move with the movable body 15 in the Y direction, but not in the X direction. The Dach prism 30Y, by contrast, is such as to move with the movable body 15 in the X direction, but not in the Y direction. Specifically, an arm 101X having a guide groove 100X is fixed to the movable body 15. A pin 102X slidably fitted into the guide groove 100X is fixed to a movable bed 103X movable in the Y direction. The Dach prism 30X is also fixed to the movable bed 103X. The movable bed 103X can be shifted in the Y direction along guides 104X and 105X. Thus, when the movable body 15 is shifted in the X direction, the Dach prism 30X is not moved, while when the movable body 15 is shifted in the Y direction, the Dach prism 30X is moved with the movable bed 103X in the Y direction. The same holds for the movement of the Dach prism 30Y. In FIG. 16, even though the Dach prisms 30X and 30Y are moved with slight inclination, the direction of travel of the reflected light beam remains unchanged with respect to the rotations around the X and Y axes, due to the property of the Dach prism. Hence, for the rotations around these two axes, no error is produced. As for the rotation of a Z axis, the direction of the light beam changes, but even in this case, the error does not occur because the images of the index gratings 23X and 23Y are merely moved in the Y direction.

In the sixth embodiment, when the distance L from the object surface being measured 14a to the moire fringe grating 12 is thrice the focal length f of the lens 25, Abbe's error is eliminated. In other words, this embodiment has the advantage that since the distance L can be increased as compared with the fifth embodiment, the degree of freedom is increased on the arrangement of components, like the fourth embodiment.

Figure 18:
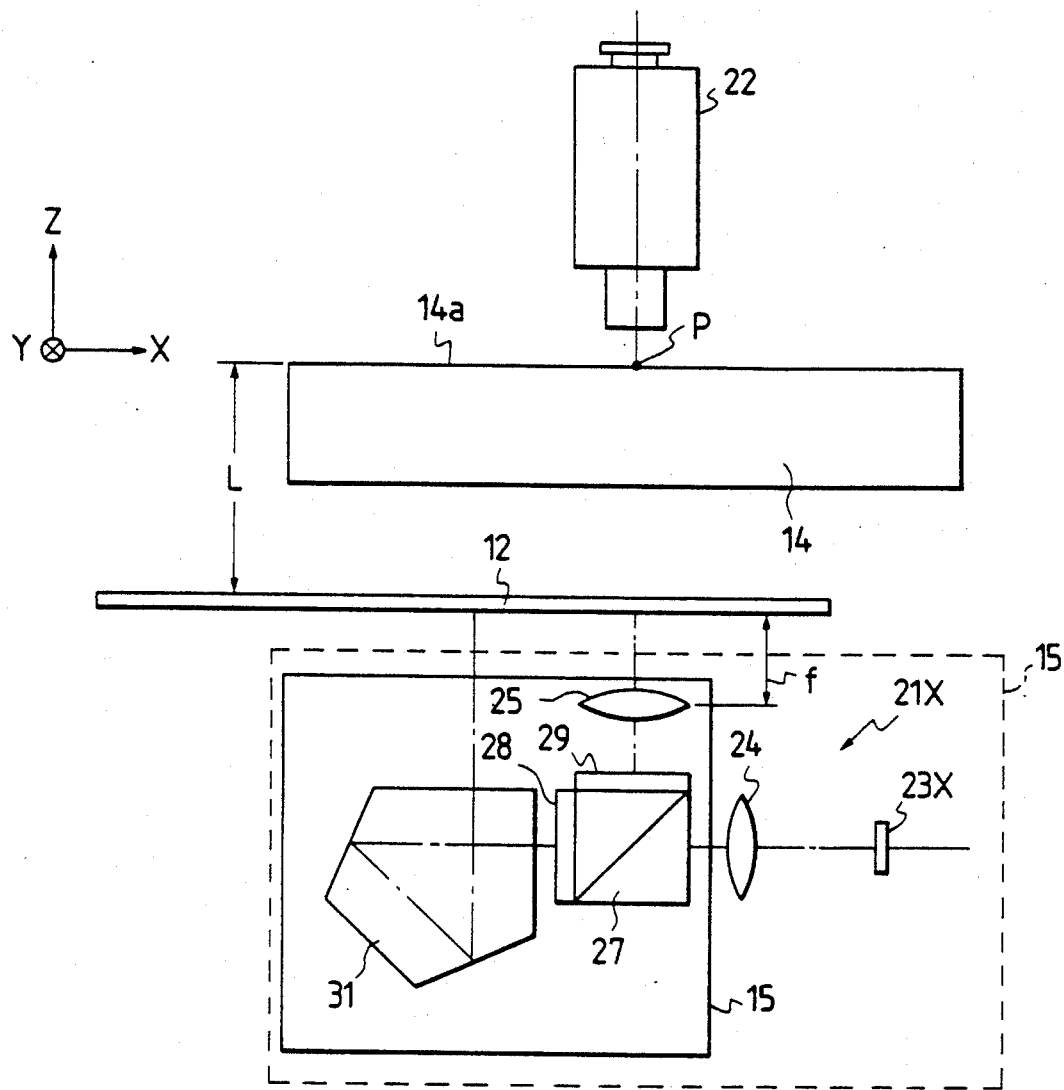
FIG. 18 is a longitudinal sectional view of a seventh embodiment.

FIG. 18 is a longitudinal sectional view of the seventh embodiment, in which, instead of the plane mirror shows the cases where an optical system fixed to the movable body 15 indicated by a solid line is moved and an optical system fixed to the movable body 1 indicated by a dotted line is moved. In either case, the grating overlapping optical system and the object surface being measured 14a opposite thereto are disposed in relation to the moire fringe grating 12. In the case of the former, when the distance L from the object surface being measured 14a to the moire fringe grating 12 is equal to the focal length f of the lens 25, Abbe's error is obviated. In the latter, on the other hand, when the distance L is twice the focal length f of the lens 25, the error is removed.

Figure 19:
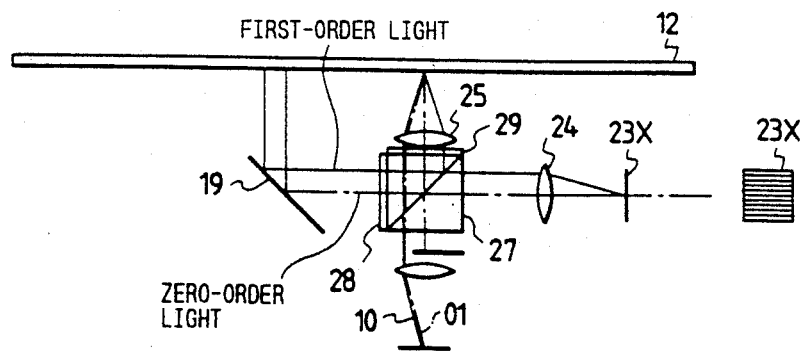
FIG. 19 is a view showing other example for detecting moire fringes.

FIG. 19 depicts other example for detecting moire fringes. A beam of light transmitted by the index grating 23X is divided into zero-order light (a chain line) and first-order light (a solid line), which travel along optical paths parallel to the optical axis through the lens 24, are transmitted through the polarization beam splitter 27 and the quarter-wave plate 28, reflected from the plane mirror 19, and arrive at the moire fringe grating 12. These two light beams reflected therefrom travel in a reverse direction, are transmitted by the quarter-wave plate 28 before being reflected at the polarization beam splitter 27, transmitted by the quarter-wave plate 29, and then projected on the moire fringe grating 12 by the lens 25. The zero-order light incident thereon is divided into a normally reflecting light component and a primary diffracting light component. Similarly, the first-order light is divided into a regularly reflecting light component and a diffracting light component. In this place, attention will be directed to one light component that the zero-order light has been diffracted [01 (a chain line)] and the other light component that the first-order light has regularly been reflected [10 (a solid line)]. These two light components (01, 10), after being reflected from the grating 12, traverse the same optical path, so that they interfere with each other. Consequently, when the moire fringe grating 12 is moved to the right or left, moire fringes are secured which vary with the ruling spacing of the grating as a period. By counting the moire fringes, the displacement of the grating can be determined. It is needless to say that the present invention is also applicable to other known methods of detecting moire fringes. For the so-called laser scale, the area of the index gratings 23X and 23Y is merely assumed as the optical system for dividing the light beam, which is substantially the same as for moire fringe detection.

Figure 20:
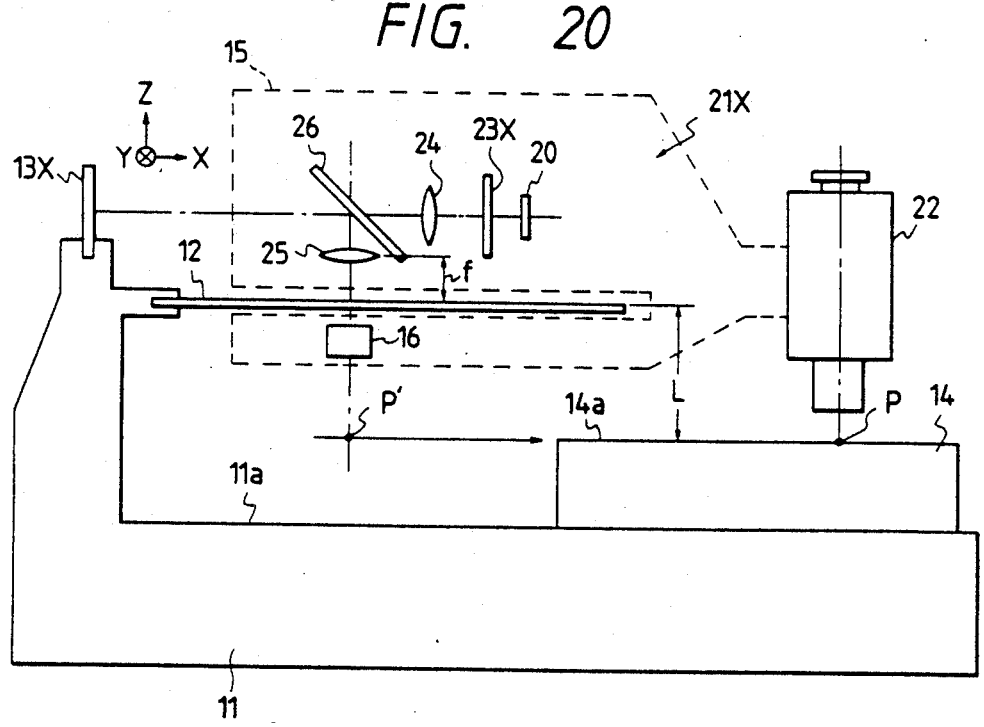
FIG. 20 is a longitudinal sectional view of a modification example of the fourth embodiment.

In the above explanation, only the examples in which the image of the index grating is projected on the moire fringe grating have been shown, but even through the light beam travels in a reverse direction, the effect of the present invention can be brought about. FIG. 20 is a longitudinal sectional view of a modification example derived from the fourth embodiment (FIG. 11). This figure is different from FIG. 11 in that the light source 16 and the detector 20 are replaced with each other. The light beam from the light source 16 illuminates the moire fringe grating 12. The light beam therefrom, after passing through the lens 25, is reflected from the semi-transmissive mirror 26 and the plate mirror 13X, and transmitted by the semi-transmissive mirror 26. The image of the grating 12 is then projected on the index grating 23X by the lens 24. The resultant moire fringes are detected by the detector 20. In this embodiment, since the light ray merely travels in a reverse direction, Abbe's error can be removed when L+f, like the case of FIG. 6. For each of the other embodiments, the same relationship is established.

What is claimed is:

1. A high-accuracy position comparator, comprising:
   a length-measuring grating fixed to a body of said comparator, having a ruling extending two-dimensionally;
   reflecting means fixed to said body;
   an index grating having the ruling following substantially the same direction as that of said length-measuring grating;
   a grating overlapping optical system including projecting means for once projecting, at infinity, an image of one of said length-measuring grating and said index grating toward said reflecting means and imaging means for forming the projected image at infinity reflected by said reflecting means on the other of said length-measuring grating and said index grating;
   fringe detecting means for detecting fringes produced by overlapping said length-measuring grating with said index grating; and
   measuring position detecting means for detecting a position of a measuring point on an object being measured,
   said grating overlapping optical system and said fringe detecting means being fixed up to a movable unit movable with respect to said body.

2. A high-accuracy position comparator, comprising:
   a length-measuring grating fixed to a body of said comparator, having ruling extending two-dimensionally;
   reflecting means fixed to said body;

a grating overlapping optical system including projecting means for once projecting, at infinity, an image of said length-measuring grating toward said reflecting means and imaging means for forming the projected image at infinity reflected by said reflecting means on said length-measuring grating;

fringe detecting means for detecting fringes produced by overlapping said length-measuring grating with the image of said length-measuring grating; and measuring position detecting means for detecting a position of a measuring point on an object being measured, said grating overlapping optical system and said fringe detecting means being fixed to a movable unit movable with respect to said body.

3. The comparator according to claims 1 or 2, wherein the image of said length-measuring grating is projected toward said reflecting means through a reflecting mirror, the projected image at infinity reflected by said reflecting means being overlapped with said length-measuring grating through said reflecting mirror, and a distance from the measuring point on said object to a position where said length-measuring grating is overlapped being equal to a focal length of said projecting means.

4. The comparator according to claims 1 or 2, wherein said reflecting means is arranged to intersect perpendicular to said length-measuring grating.

5. A high-accuracy position comparator, comprising:

a length-measuring grating fixed to a body of said comparator, having ruling extending two-dimensionally;

an index grating having the ruling following substantially the same direction as that of said length-measuring grating;

a grating overlapping optical system including projecting means for once projecting, at infinity, an image of one of said length-measuring grating and said index grating toward said length-measuring grating and imaging means for forming the projected image at infinity reflected by said length-measuring grating on the other of said length-measuring grating and said index grating;

fringe detecting means for detecting fringes produced by overlapping said length-measuring grating with said index grating; and measuring position detecting means for detecting a position of a measuring point on an object being measured, said grating overlapping optical system and said fringe detecting means being fixed to a movable unit movable with respect to said body.

6. The comparator according to claim 5, wherein a distance from the measuring point on said object being measured to a position where said length-measuring grating is overlapped with said index grating is equal to twice a focal length of said projecting means.

7. The comparator according to claims 1 or 2, wherein said length-measuring grating is constructed by overlapping two rulings following directions different from each other.

8. The comparator according to claims 1 or 2, wherein the image of said index grating is projected toward said reflecting means through a reflecting mirror, the projected image at infinity reflected by said reflecting means being overlapped with said length-measuring grating through said reflecting mirror, and a distance from the measuring point of said object to a position where said length-measuring grating is overlapped being equal to thrice a focal length of said projecting means.

* * * * *